United States Patent [19]

Kubo et al.

[11] Patent Number: 5,132,679
[45] Date of Patent: Jul. 21, 1992

[54] REMOTE CONTROL SYSTEM FOR A PLURALITY OF CONTROLLED DEVICES

[75] Inventors: Seiichi Kubo, Osaka; Masao Ikezaki, Neyagawa, both of Japan

[73] Assignee: Matsushita Electric Industrial Co., Ltd., Kadoma, Japan

[21] Appl. No.: 597,688

[22] Filed: Oct. 16, 1990

[30] Foreign Application Priority Data

Oct. 17, 1989 [JP] Japan .................................. 1-269343

[51] Int. Cl.⁵ ............................................... H03J 9/06
[52] U.S. Cl. ........................... 340/825.22; 340/825.24; 340/825.69; 340/825.72; 455/4.1
[58] Field of Search ....................... 340/825.22, 825.25, 340/825.69, 825.24, 825.71, 825.72; 358/194.1, 188; 455/4, 5, 6, 151, 352

[56] References Cited

U.S. PATENT DOCUMENTS

| | | | |
|---|---|---|---|
| 4,527,204 | 7/1985 | Kozakai et al. | 455/151 |
| 4,598,287 | 7/1986 | Osakabe et al. | 340/825.25 |
| 4,807,052 | 2/1989 | Amano | 340/825.72 |
| 4,885,803 | 12/1989 | Hermann et al. | 455/4 |
| 4,897,718 | 1/1990 | Testin et al. | 358/188 |

FOREIGN PATENT DOCUMENTS 133500  2/1985  European Pat. Off. ........ 340/825.25
2191643 12/1987  United Kingdom .

OTHER PUBLICATIONS

F. William Gutzwiller, "Control Networks for the Home", Machine Design, Oct. 1983, vol. 55, No. 24, pp. 109-112.

Primary Examiner—Donald J. Yusko
Assistant Examiner—John Giust
Attorney, Agent, or Firm—Cushman, Darby & Cushman

[57] ABSTRACT

Operation information for distinguishing each operation of a wireless signal transmitter of a remote control system is included in a wireless signal of the wireless signal transmitter, the operation information is memorized in an AV apparatus which is designated by the wireless signal transmitter, and the wireless signal or only one of plural message frames which have the same information as the wireless signal and are transferred from other AV apparatus connected to a common communication line is selected by comparing the operation information of the message frame with the memorized message frame in the AV apparatus.

3 Claims, 11 Drawing Sheets

REMOTE CONTROL SYSTEM FOR A PLURALITY OF CONTROLLED DEVICES

FIELD OF THE INVENTION AND RELATED ART STATEMENT

1. Field of the Invention

The present invention relates generally to a remote control system for electronic apparatus, and more particularly to a remote control system for controlling a system having plural electronic apparatus such as audio apparatus and video apparatus which are connected to a common communication line.

2. Description of the Related Art

Figure 1A:
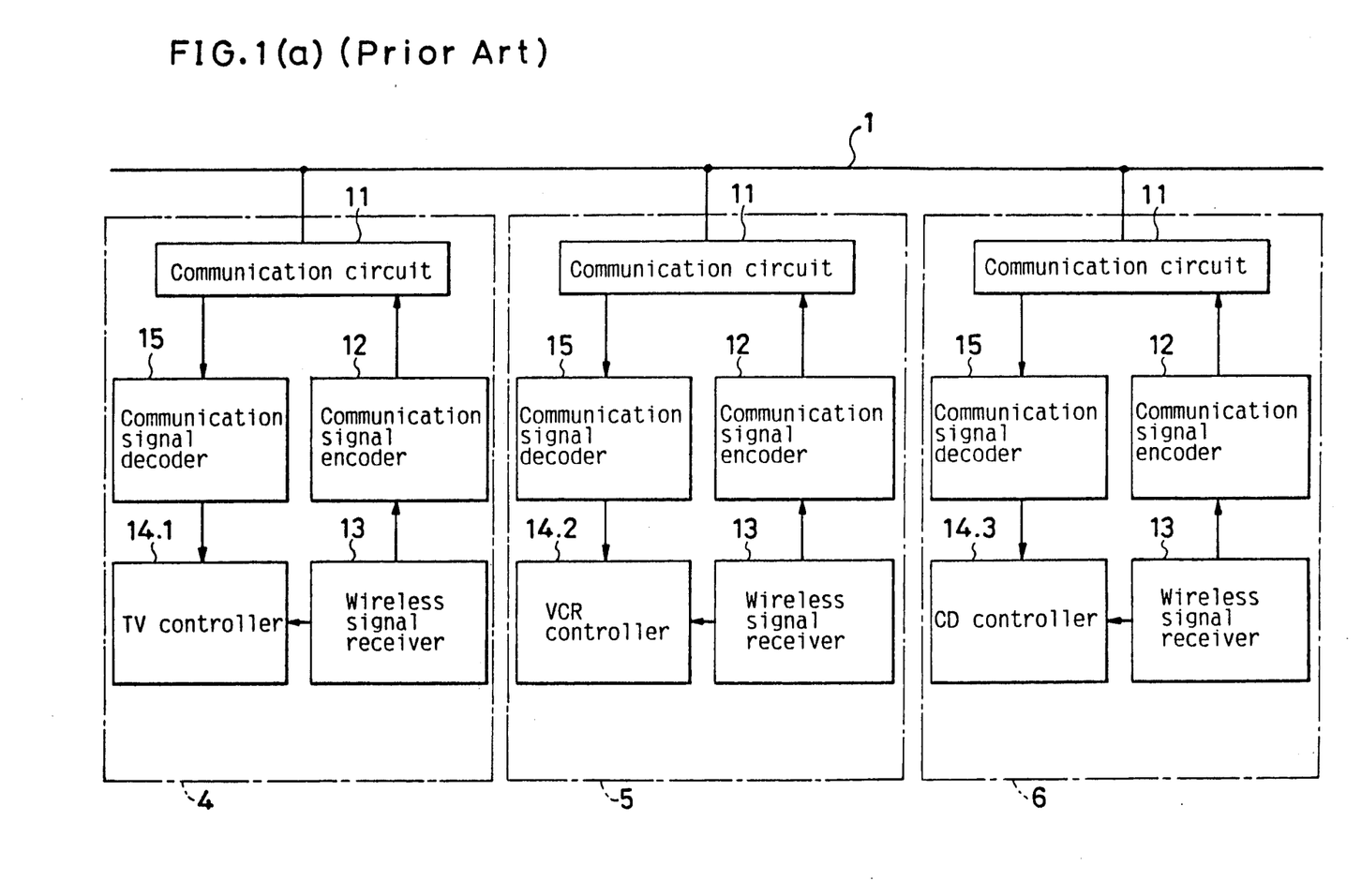
Figure 1B:
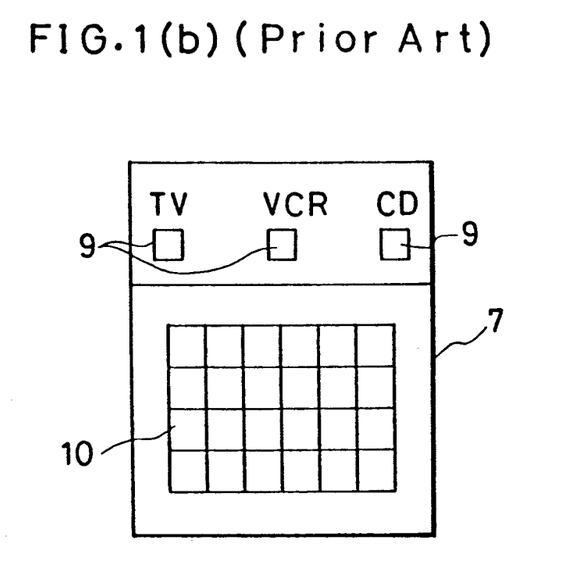

FIG. 1 (a) is a block diagram of a remote control system of the prior art. Referring to FIG. 1, plural AV apparatus such as a television receiver 4, a video cassette recorder 5 and a compact disc player 6 are connected to a common communication line 1. Each AV apparatus comprises a communication circuit 11 for sending a signal from the AV apparatus to the communication line 1 and for receiving a signal from the communication line 1, and a wireless signal receiver 13 for receiving a wireless signal from a wireless transmitter 7 shown in FIG. 1 (b). Each AV apparatus further comprises a communication signal encoder 12 for encoding the output of the wireless signal receivers 13 and for sending it to the communication circuits 11 and a communication signal decoder 15 for decoding the output of the communication circuit 11 and for applying the decoded signal to a device controller such as a TV controller 14.1, a VCR controller 14.2 and a CD controller 14.3. The TV controller 14.1 controls the television receiver 4, the VCR controller 14.2 controls the video cassette recorder 5 and the CD controller 14.3 controls the compact disc player 6.

The wireless transmitter 7 comprises device selection keys 9, an operation keyboard 10 and a transmission device such as an infraed LED, an ultrasonic element, or a small sized electromagnetic antenna.

Figure 2:
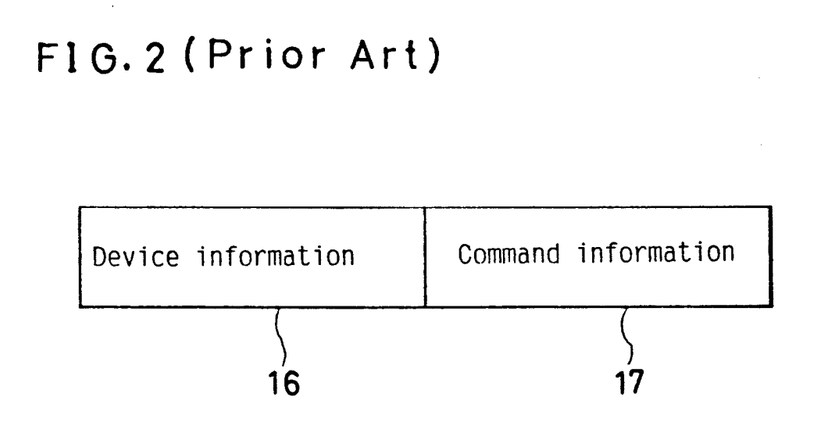
FIG. 2 is the data configuration of the wireless signal in the remote control system shown in FIG. 1.

FIG. 2 is a signal configuration of the wireless signal which is transmitted from the wireless transmitter 7. The wireless signal comprises "device information" 16 and "command information" 17. The device information is to designate an AV apparatus which is controlled by the wireless signal, and the command information 17 includes information for designating the kind of control.

Operation of the conventional remote control system is elucidated hereafter. An operator designates one of the AV apparatus with the device selection key 9 and designates the kind of operation of the AV apparatus with the operation keyboard 10 of the wireless transmitter 7. The wireless signal from the wireless transmitter 7 is received by the respective wireless signal receivers 13. The received signal is demodulated and is decoded in the wireless signal receiver 13. Then, the device information 16 of the received signal is compared with its own "device address" which is set in the wireless signal receivers 13 in advance. When the received device information conforms with its own device address, the command information 17 is applied to its own device controller (TV controller 14.1, VCR controller 13.1 or CD controller 14.3) and the AV apparatus is controlled by the device controller.

When the received device information 16 does not conform with its own device address, the signal which is decoded by the wireless signal receiver 13 is applied to the communication signal encoder 12 and is encoded on the basis of a predetermined signal format. Then the encoded signal is applied to the communication circuit 11 and is transmitted to the communication line 1 in compliance with a predetermined communication rule and a communication protocol. The data which is transmitted to other AV apparatus through the communication line 1 is designated as a "message frame".

The communication circuit 11 watches the message frame which is received from the communication line 1. When a message frame having the device information which conforms with its own device address arrives at the communication circuit 11, the communication circuits 11 receives the message frame. The received message frame is sent to the communication signal decoder 15. In the communication signal decoder 15, command information 17 in the message frame is read out, and is sent to the device controller 14.1, 14.2 or 14.3. Thus, the AV apparatus is controlled by the command information 17.

According to the conventional remote control system as mentioned above, in the event that the command by which the volume of the television receiver 4 is increased, for example, is sent from the wireless signal transmitter 7, the wireless signal is received by the wireless signal receiver 13. In the wireless signal receiver 13 of the television receiver 4, when the device information 16 of the wireless signal conforms with the device address of the television receiver 4, the command information 17 of the received wireless signal is applied to the TV controller 14.1. Consequently, the volume controller of the television receiver 4 (not shown) is controlled to increase the volume by a predetermined level.

On the other hand, the wireless signal is also received by both the wireless signal receivers 13 of the video cassette recorder 5 and compact disc player 6. In the video cassette recorder 5 and compact disc player 6, the device information 16 of the received wireless signal does not conform with the device address. Therefore, the command information 17 of the wireless signal is not sent to the VCR controller 14.2 or the CD controller 14.3, but is sent to the respective communication signal encoders 12 of the video cassette recorder 5 and compact disc player 6. The device information 16 and the command information 17 in the received wireless signal are constituted into respective predetermined formats by the communication encoders 12 and are applied to the respective communication circuits 11. Then the encoded signals are sent to the communication line 1 as the message frames through the respective communication circuits 11.

The communication circuit 11 of the television receiver 4 receives through the communication line 1, the message frames sent from both communication circuits 11 of the video cassette recorder 5 and the compact disc player 6, besides the message frame received through its own wireless signal receiver 13. When the message frame from the video cassette recorder 5 is received for the first time, conformity of the device information of the message frame with the device address of the television receiver 4 is examined, and then the command information in the message frame is decoded by the communication signal decoder 15 and is applied to the TV controller 14.1.

In a similar manner, the message frame from the communication circuit 11 of the compact disc player 6 is received by the communication circuit 11 of the television receiver 4 for the second time, and the command information of the message frame is decoded by the communication signal decoder 15 and is applied to the TV controller 14.1 again, since the device information 16 of the message frame conforms with the device address of the television receiver 4. Consequently, command information for increasing the volume of the television receiver 4 is received three times in total and given to the TV controller 14.1. Thereby, the volume of the television receiver 4 is increased by three steps.

As mentioned above, in the conventional remote control system, when one operation is commanded by the wireless signal, plural actions of an AV apparatus are performed by plural command information which are transferred from other AV apparatus. Such plural command information cause unexpected action of the AV apparatus, particularly in successive actions of variation of volume or track skip operation in the compact disc player 6.

OBJECT AND SUMMARY OF THE INVENTION

An object of the present invention is to provide a remote control system of electronic apparatus which are connected to a common communication line and are correctly controlled by a wireless signal which is transmitted by a wireless signal transmitter.

The remote control system for the electronic apparatus in accordance with the present invention comprises:

a communication line for communicating plural electronic apparatus to be controlled, a wireless signal transmitter for transmitting a wireless signal including device information for designating an electronic apparatus, command information for operating the electronic apparatus and an operation information for distinguishing each operation of the wireless signal transmitter, electronic apparatus to be controlled by the information included in the wireless signal, comprising:

wireless signal receiver means for receiving the wireless signal and determining the wireless signal for designating its own electronic apparatus on the basis of the device information, device control means for controlling its own electronic apparatus on the basis of the command information, when the electronic apparatus is designated by the device information, an operation memory for memorizing the operation information, when its own electronic apparatus is designated by the device information, communication signal encoder means for forming a message frame from the received wireless signal in compliance with a predetermined communication control rule and communication protocol, when the electronic apparatus is not designated by the device information, communication means for transmitting the message frame to the communication line and for receiving a message frame from other electronic apparatus connected to the communication line, comparison and determination means for comparing the operation information in a message frame from other electronic apparatus with the operation information memorized in the operation memory and determining introduction of the message frame into its own electronic apparatus on the basis of a predetermined rule, and for replacing the operation information memorized in the operation memory with the operation information of the message frame, when said message frame is introduced into its own electronic apparatus, and communication signal decoding means for decoding the message frame and for applying the decoded information to the device control means.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 (a) is the circuit block diagram of the remote control system of the electronic apparatus in the prior art;

FIG. 1 (b) is the plan view of the wireless signal transmitter in the prior art;

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 3A:
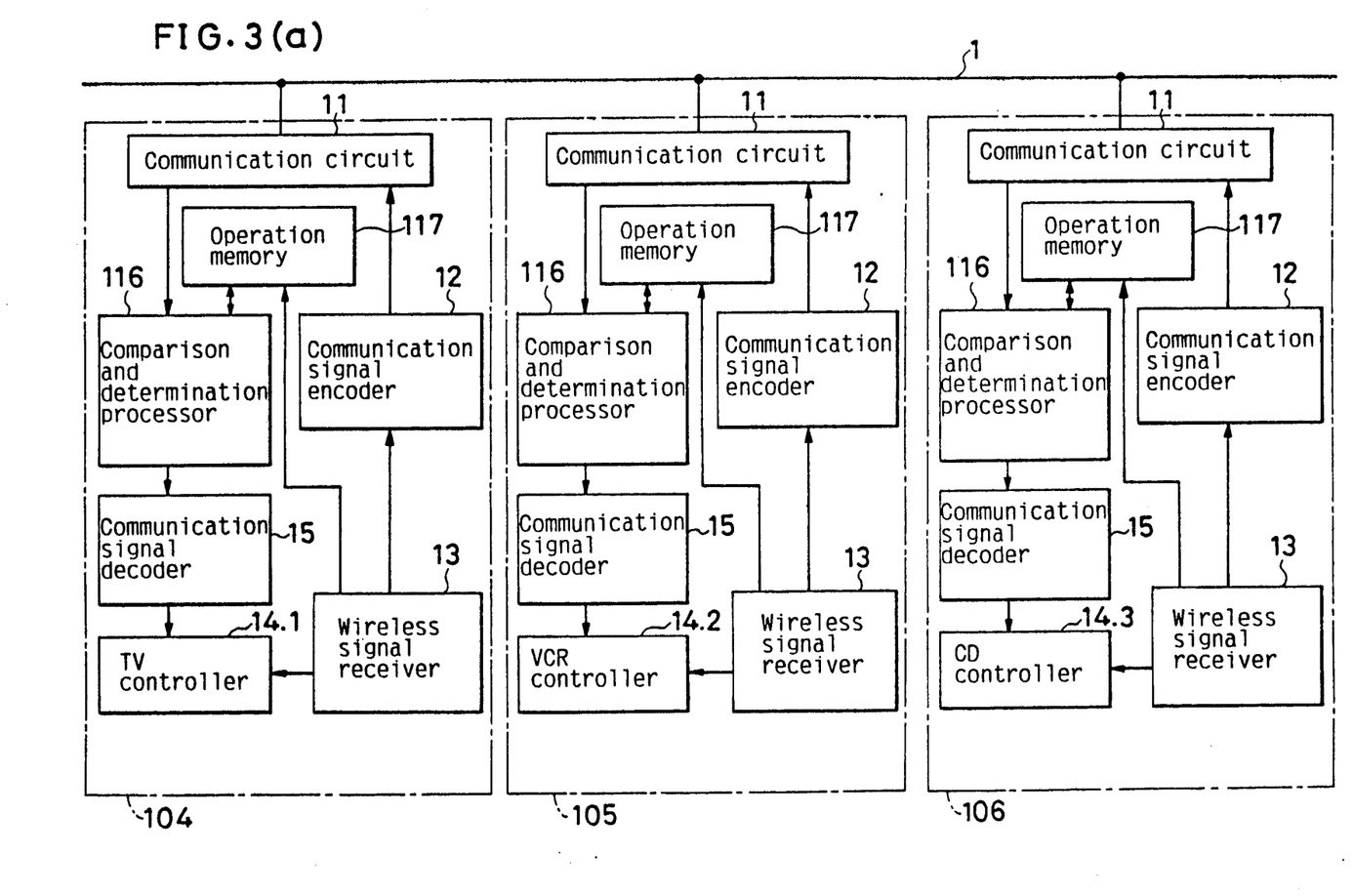
FIG. 3(a) is a circuit block diagram of an embodiment of a remote control system of electronic apparatus in accordance with the present invention.
Figure 3B:
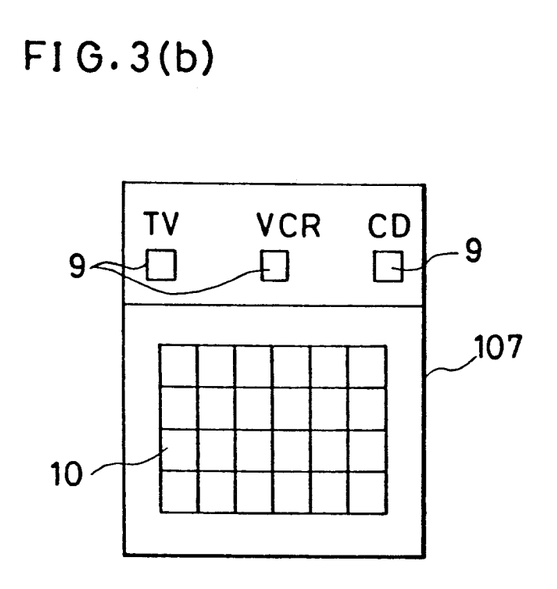
FIG. 3(b) is a plan view of a wireless signal transmitter of the embodiment.

FIG. 3(a) is a circuit block diagram of an embodiment of the remote control system of the electronic apparatus in accordance with the present invention. Referring to FIG. 3(a), plural AV apparatus such as a television receiver 104, a video cassette recorder 105 and a compact disc player 106, for example, are connected to a common communication line 1. The television receiver 104 comprises a wireless signal receiver 13 for receiving a wireless signal which is transmitted from a wireless signal transmitter 107 shown in FIG. 3(b). The wireless signal transmitter 107 comprises plural device selection keys 9 and an operation keyboard 10. An operator of the remote control system can designate one of these AV apparatus with the device selection key 9. The operation keyboard 10 is for designating a function of the AV apparatus which is selected by the device section key 9.

Figure 4:
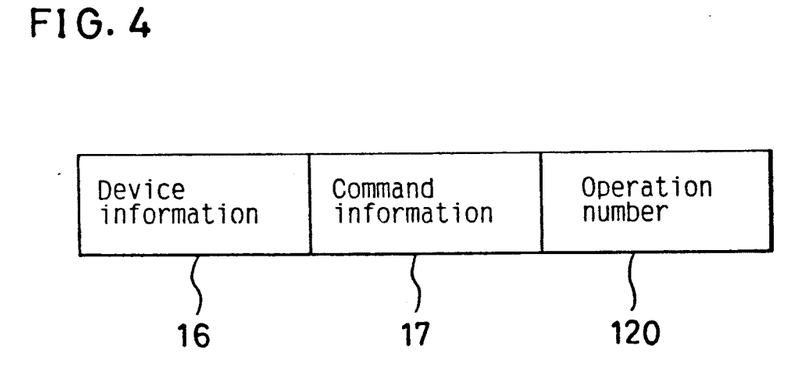
FIG. 4 is a data configuration of the wireless signal in a first embodiment.

FIG. 4 is a configuration of information which is included in the wireless signal in a first embodiment. Referring to FIG. 4, device information 16 is for designating an AV apparatus to be controlled, such as the television receiver 104, video cassette recorder 105 or compact disc player 106. Command information 17 represents a function which is performed by the AV apparatus. An operation number 120 is one of numerals which circulate through a predetermined numbers, for example 0, 1, 2, 3, 4, 5, 6, 7, 8, 9, 0, 1, 2, 3, ... transmission of the wireless signal and circulates through 0-9. The operation number 120 represents operation information.

Referring to FIG. 3(a), the television receiver 104, for example, is provided with a communication signal encoder 12 for encoding the output of the wireless signal receiver 13. The encoded signal is applied to a communication circuit 11 which is connected to the communication line 1. An operation memory 117 memorizes the operation number 120 of the wireless signal having the device information 16 which designates its own AV apparatus. A comparison and determination processor 116 is connected between the operation memory 117 and the communication circuit 11. A communication signal decoder 15 is connected between the comparison and determination processor 116 and a TV controller 14.1 for controlling the television receiver 104.

The video cassette recorder 105 has the same configuration as the television receiver 104 except for a VCR controller 14.2 for controlling the video cassette recorder 105, and the compact disc player 106 has also the same configuration as the television receiver 104 except for a CD player controller 14.3 for controlling the compact disc player 106.

Figure 5:
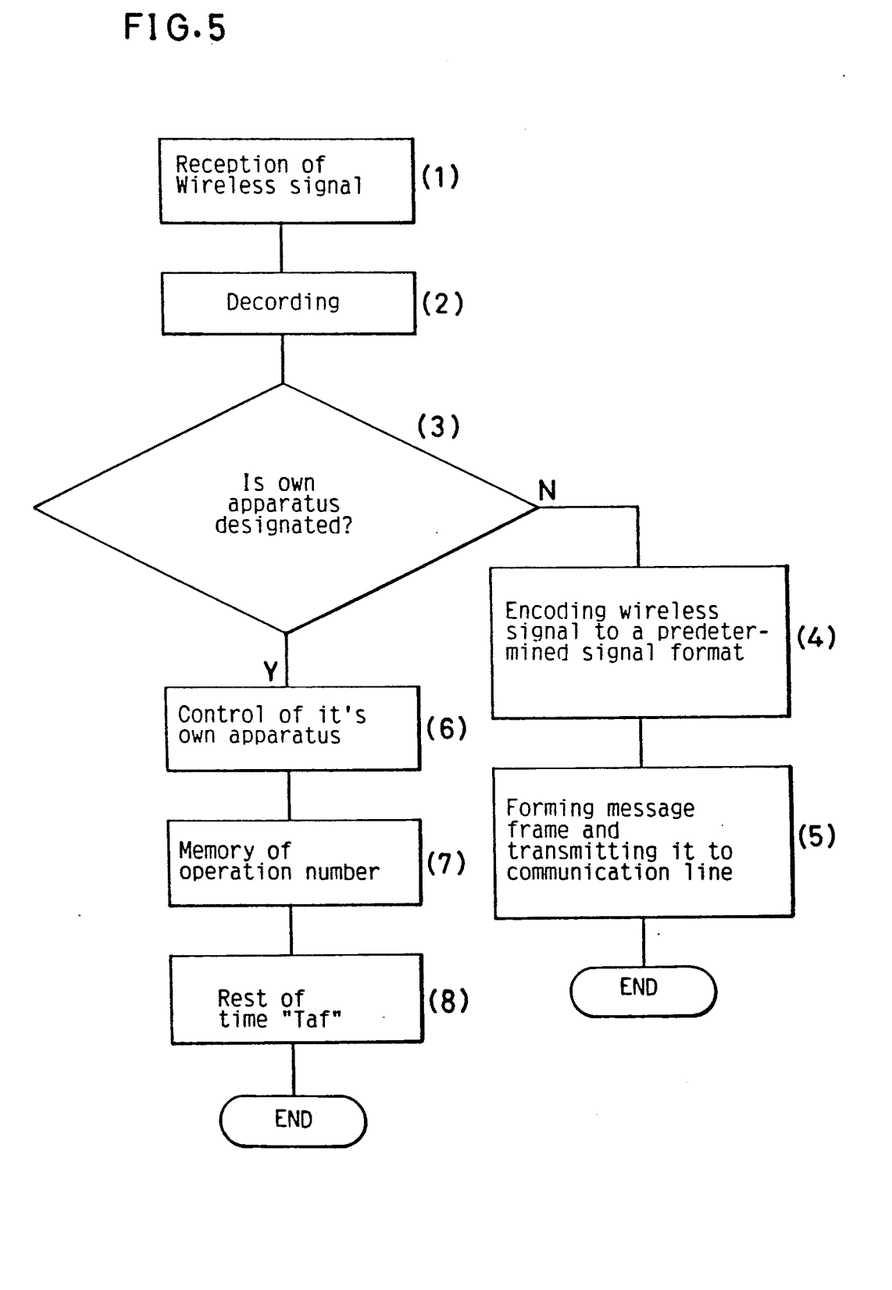
FIG. 5 is a flow chart of operation of reception of the wireless signal in the first embodiment.

Operation of the first embodiment is elucidated hereafter with reference to FIG. 5 and FIG. 6. The wireless signal which is transmitted from the wireless signal transmitter 107 is received by the respective wireless signal receivers 13 of the television receiver 104, video cassette recorder 105 and or compact disc player 106 (FIG. 5 Step 1). The received wireless signal is demodulated and decoded in the wireless signal receivers 13; and the device information 16, command information 17 and operation number 120 are read out (Step 2). The device information 16 is compared with each "device address" which specifies the television receiver 104, video cassette recorder 105 or compact disc player 106 (Step 3). The "device address" was set in each wireless signal receiver 13 in advance. When the device information 16 in the wireless signal conforms with its own device address, the command information 17 in the wireless signal is applied to its own device controller (TV controller 14.1, VCR controller 14.2 or CD player controller 14.3) (Step 6).

On the other hand, the operation number 120 in the received wireless signal is memorized in the operation memory 117 (Step 7), and a timer in the operation memory 117 is reset to "zero". The timer measures an elapsed time "Taf" after the memorization of the operation number (Step 8). The AV apparatus (television receiver 104, video cassette recorder 105 or compact disc player 106) is controlled by its own device controller on the basis of the command information 17 in the wireless signal.

On the contrary, when the device information 16 in the wireless signal does not conform with its own device address, the decoded information of the wireless signal is sent to the communication signal encoder 12 (Step 4). The decoded information is made in a predetermined signal format in the communication signal encoder 12 and is applied to the communication circuit 11. In the communication circuit 11, the encoded information is made to a "message frame" on the basis of a communication control rule and a communication protocol of the common communication line 1, and the message frame is transmitted to the communication line 1 (Step 5).

Figure 6:
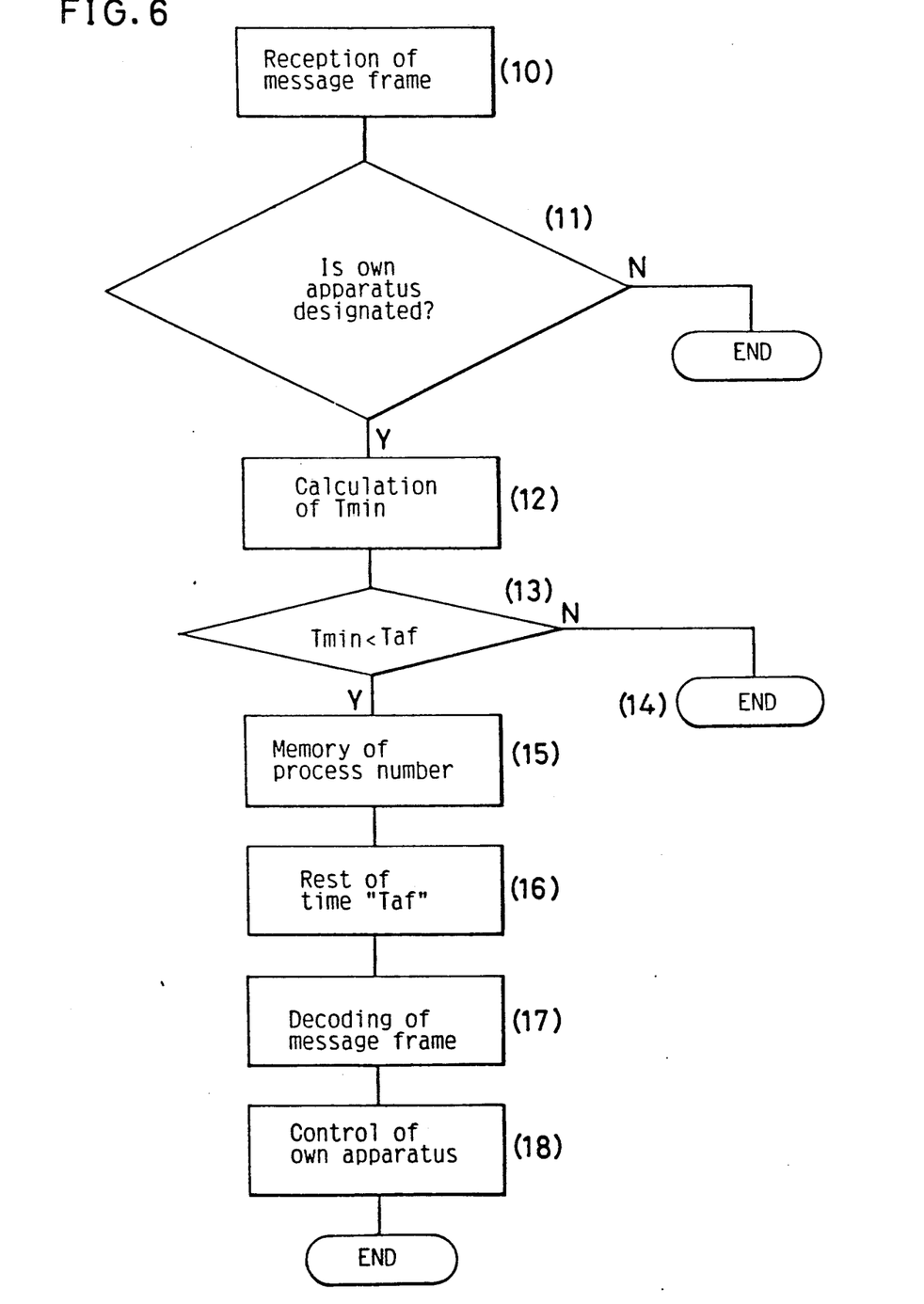
FIG. 6 is a flow chart of operation by reception of a message frame in the first embodiment.

Each communication circuit 11 watches the message frame which is sent through the communication line 1 (FIG. 6 Step 10). The device information 16 of a received message frame is compared with its own device address in the communication circuit 11 (Step 11). Consequently, all message frames which conform with its own device address are received by the communication circuit 11 and is applied to a comparison and determination processor 116. In the comparison and determination processor 116, the operation number 120 in the received message frame is compared with the operation number memorized in the operation memory 117, and the following determination processing is performed.

First, it is assumed that the "minimum transmissible time interval" of the wireless signal of the wireless signal transmitter 107 is T (second), and the operation number 120 in the wireless signal is composed of cyclically circulating ten numerals, 0, 1, 2, 3, 4, 5, 6, 7, 8 and 9. When an operator manipulates the wireless signal transmitter 107 plural times in succession, even if the operator manipulates it very quickly, the wireless signal is transmitted with the "minimum transmissible time interval" (0.2 second in the embodiment, for example).

When an operation number 120 which is memorized in the operation memory 117 is designated by X, and the operation number 120 in a received message frame is designated by Y, the minimum reception time interval "Tmin" between memory of the operation number X and reception of a message frame having the operation number Y is represented by the product of the minimum transmissible time interval T and the difference between the operation numbers X and Y (Step 12). The above-mentioned calculation is carried out in the comparison and determination processor 116.

For example, provided that $X=3$ and $Y=8$, $Tmin=(8-3)T=5T$. In other case, provided that $X=3$, $Y=3$, $Tmin=(3-3)T\rightarrow 0T$. Namely, when X equals to Y, the operation number Y turns one cycle and becomes the same operation number as the operation number X. Consequently, the minimum reception time interval Tmin becomes 10T by adding ten $(3-3+10)T$.

On the other hand, an elapsed time "Taf" from change of the data in the operation memory 117 to arrival of the next successive message frame is measured in the operation memory 117. Then, the minimum reception time interval Tmin is compared with the elapsed time Taf in the comparison and determination processor 116 (Step 13).

Consequently, when the elapsed time Taf is equal to or shorter than the minimum reception time interval Tmin (Taf≦Tmin), namely when the next successive message frame is received within a time period which is shorter than the minimum reception time interval Tmin, the message frame is determined to imply that it has been transferred from other AV apparatus. The information of the message frame is already received through the wireless signal and is not needed. Hence, the data of the message frame is not applied to the communication signal decoder 15 and is cancelled (Step 14).

On the other hand, when the elapsed time Taf is longer than the minimum reception time interval Tmin (Taf>Tmin), namely, when the next successive message frame is received after the minimum reception time interval Tmin, the message frame is a new message frame which is not yet received by the AV apparatus. Therefore, the message frame is needed and is sent to the comparison and determination processor 116. Then, the operation number 120 of the message frame is memorized in the operation memory 117 (Step 15), and the timer means of the elapsed time Taf is reset (Step 16). The message frame is sent to the communication signal decoder 15, and the command information in the message frame is separated from the message frame (Step 17) and is applied to the device controller to control the AV apparatus (Step 18).

Figure 7:
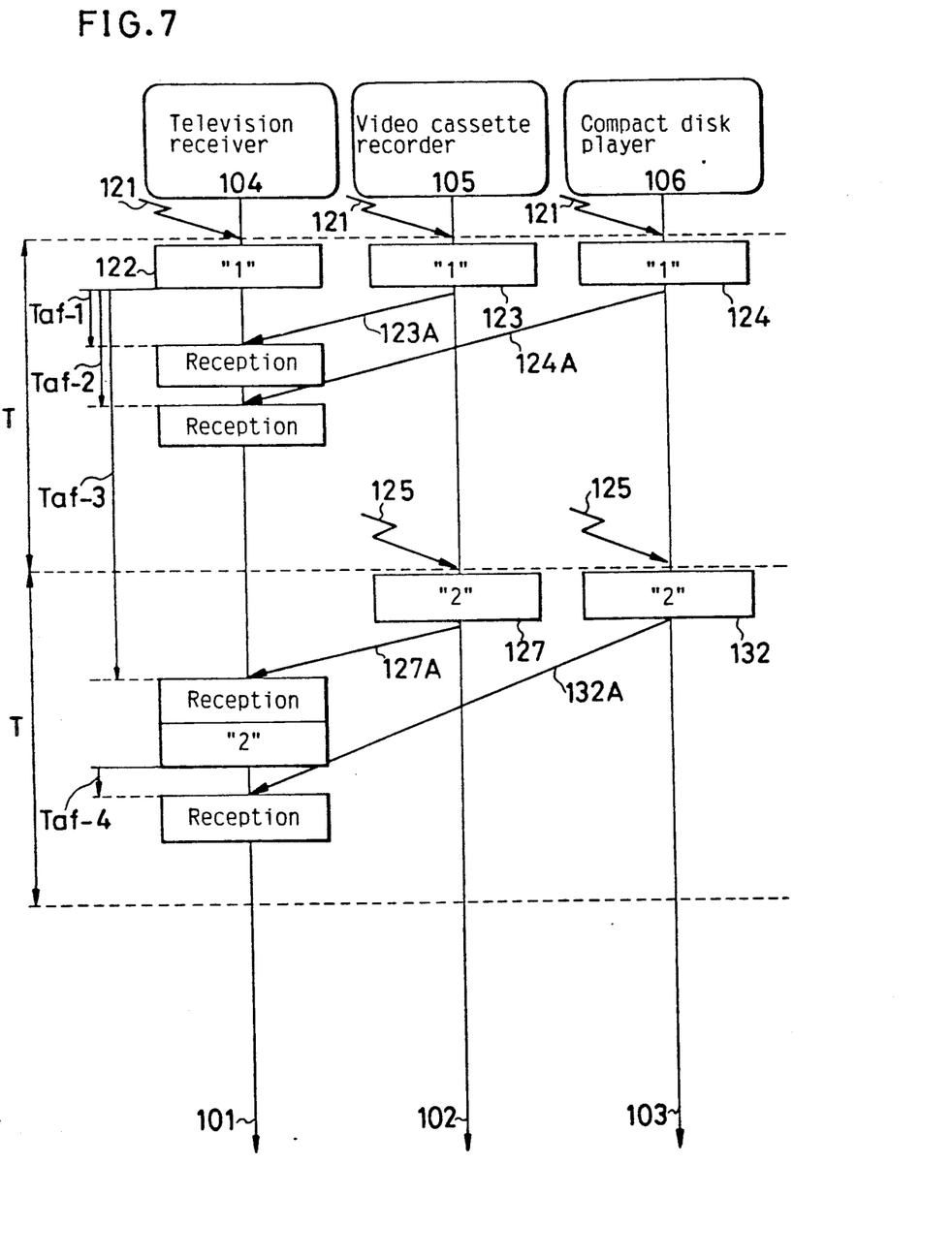
FIG. 7 is a timing chart of operation of the first embodiment.

FIG. 7 is a timing chart of the above-mentioned operation. Vertical lines 101, 102 and 103 represent an elapsed time in operation of the television receiver 104, video cassette recorder 105 and compact disc player 106, respectively. Zigzag arrows 121 and 125 represent wireless signals which are received by the television receiver 104, video cassette recorder 105 and compact disc player 106, respectively.

Referring to FIGS. 3, 4 and 7, the television receiver 104 is designated by the device information 16 in the wireless signal, for example. The wireless signal 121 of the wireless signal transmitter 107 is received by the television receiver 104, video cassette recorder 105 and compact disc player 106. Since the television receiver 104 is designated by the device information 16, the wireless signal receiver 13 of the television receiver 104 receives the wireless signal, and the command information 17 of the wireless signal is applied to the TV controller 14.1. On the other hand, the operation number 120 in the wireless signal 121 is "1", for example, and the operation number "1" is memorized in the operation memory 117. The process is designated by a box 122 enclosing operation number "1" in FIG. 7. The TV controller 14.1 controls the television receiver 104 on the basis of the command information in the received wireless signal.

The wireless signal 121 is also received by the wireless signal receiver 13 of the video cassette recorder 105. Since the video cassette recorder 105 is not designated by the decoded information of the wireless signal 121 is sent to the communication signal encoder 12 of the video cassette recorder 105 and is encoded. the encoded signal is made to a message frame 123 and is transferred to the communication circuit 11 of the television receiver 104 and is received thereby as shown by arrow 123A.

In a similar manner mentioned above, the wireless signal receiver 13 of the compact disc player 106 also receives the wireless signal 121. Since the compact disc player is not designated by the device information 16 in the wireless signal 121, the decoded information of the wireless signal 121 is also made to a message frame 124 and is transferred to the communication circuit 11 of the television receiver 104 as shown by arrow 124A.

The message frame 123 is received by the communication circuit 11 of the television receiver 104 at first, for example. The operation number "1" in the message frame is applied to the comparison and determination processor 116 and is compared with the operation mumber "1" which is memorized in the operation memory 117. Then, the minimum reception time interval Tmin is calculated. In this case, since X=1 and Y=1, Tmin=10T. Moreover, the elapsed time Taf−1 from memory of the process number "1" in the operation memory 117 to reception of the message frame 123 is compared with the Tmin (10T) in the comparison and determination processor 116. Obviously, the minimum reception time interval Tmin (10T) is longer than the elapsed time Taf−1, and hence the message frame 123 is not needed. Thus, the message frame 123 is cancelled and is not sent to the communication signal decodeer 15 and the TV controller 14.1.

In a similar manner mentioned above, with respect to the message frame 124 which is transferred from the compact disc player 106, the elapsed time Taf−2 is also shorter than the minimum reception time interval Tmin (10T), and thus the message frame 124 is cancelled. In the above-mentioned operation, the transfer time of the message frame 123 or 124 is, in general, shorter than the minimum transmissible time interval T.

Subsequently, in the event that the television receiver 104 is designated by the device information 16, but can not receive the wireless signal from the wireless signal transmitter 107 due to an unexpected obstacle which exists in the path of the wireless signal, the television receiver 104 can be indirectly controlled by the message frame. The wireless signal 125 is received by the wireless signal receivers 13 of the video cassette recorder 105 and compact disc player 106 as shown in FIG. 7. Since both the video cassette recorder 105 and the compact disc player 106 are not designated by the device information, the decoded information of the wireless signal received by the video cassette recorder 105 is made to a message frame 127 and is transferred to the television receiveer 104 through the communication line 1 as shown by arrow 127A. The decoded information of the wireless signal received by the compact disc player 106 is also made to a message frame 132 and is transferred to the television receiver 104 through the communication line 1 as shown by arrow 132A.

The message frames 127 and 132 have the same operation number "2".

The message frame 127 is received by the communication circuit 11 of the television receiver 104, and the operation number "2" of the message frame 127 is compared with the operation number "1" which is memorized in the operation memory 117. Consequently, the minimum reception time interval Tmin is obtained by substracting "1" from "2" (Tmin=2−1=1T). Moreover, the elapsed time Taf−3 from memory of operation number "1'" in the previous operation to reception of the message frame 127 is compared with the minimum reception time interval Tmin (Tmin=1T) in the comparison and determination processor 116. As shown in FIG. 7, since the elasped time Taf−3 is longer than the minimum transmission time interval T, the elasped time Taf−3 is longer than the minimum reception time interval Tmin (Tmin=1T). Therefore, the message frame 127 is determined to be needed by the comparison and determination processor 116. Consequently, the command information in the message frame 127 is decoded in the communication signal decoder 15 and is applied to the TV controller 14.1. Furthermore, the operation number "2" is applied to the operation memory 117, and the operation number "1" memorized in the operation memory 117 is replaced with the operation number "2" of the message frame 127 by the comparison and determination processor 116. The television receiver 104 is controlled by the TV controller 14.1 on the basis of the command information in the message frame 127.

Subsequently, the message frame 132 from the compact disc player 106 is received by the television receiver 104. Since the message frame 132 is made on the basis of the wireless signal 125, the message frame 132 has the same device information, command information and operation number as those of the message frame 127. The operation number "2" of the message frame 132 is compared with the operation number "2" memorized in the operation memory 117, and the minimum reception time interval Tmin is calculated (Tmin=(2−2)T→10T). Then, the elasped time Taf−4 from memorizing of the operation number "2" to the reception of the message frame is measured. In this case, the elapsed time Taf−4 is shorter than the minimum reception time interval Tmin (10T). Hence the message frame 132 is determined as not necessary, and is cancelled.

In the above-mentioned case, the arrival order of the message frames 123 and 124 or 127 and 132 to the television receiver 104 is influenced by conflict of plural message frames in the communication line 1. In the example shown in FIG. 7, the message frames 123 and 127 have arrived to the television receiver 104 prior to the message frames 124 and 132, respectively but the above-mentioned operation is not influenced by the arrival order of the message frames.

Figure 8:
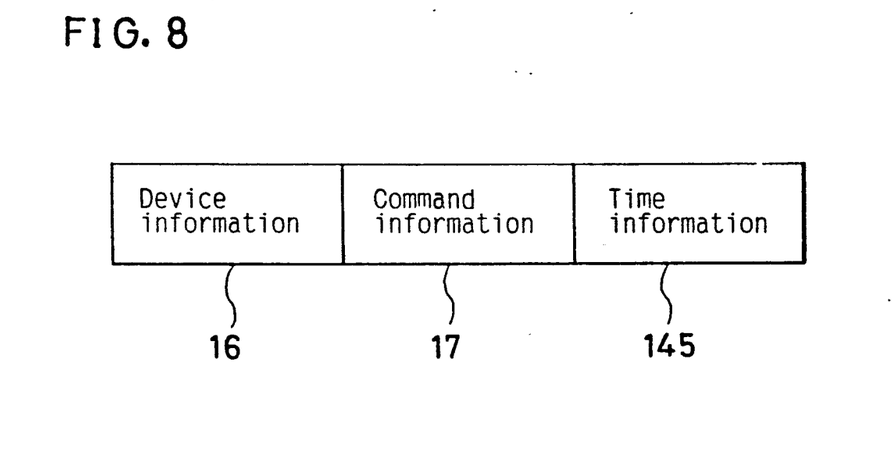
FIG. 8 is a data configuration of the wireless signal in a second embodiment.

FIG. 8 is a configuration of information of a wireless signal in a second embodiment. In the second embodiment, the wireless signal comprises the device information 16, command information 17 and a time information 145. The configuration of the respective components in the AV appparatus (television receiver 104, video cassette recorder 105 and compact disc player 106) is identical with that of the first embodiment shown in FIG. 3(a).

In the second embodiment, the wireless signal transmitter 107 comprises a time information generator for generating a signal representing a present time. When an operator manipulates the wireless signal transmitter 107 to transmit a wireless signal to an AV apparatus, as shown in FIG. 8, the "time information" 145 for representing the present time is included in the wireless signal which is transmitted by the wireles signal transmitter 107. The wireless signal is received by the respective wireless signal receivers 13 of the television receiver 104, video cassette recorder 105 and compact disc player 106. The received wireless signal is demodulated and decoded in the wireless signal receiver 13. Then, the device information 16 in the wireless signal is compared with its own device address which is stored in the wireless signal receiver 13. When the device information 16 conforms with the device address, the command information 17 in the wireless signal is sent to its own device controller (TV controller 14.1, VCR controller 14.2 or CD player controller 14.3), and the time information 145 in the wireless signal is memorized in the operation memory 117.

When the device information 16 does not conform with its own device address, the decoded information of the wireless signal is sent to the communication signal encoder 12, and is made to a signal having a predetermined common signal format. The output of the communication signal encoder 12 is applied to the communication circuit 11, and is made to a message frame in compliance with a predetermined communication control rule and communication protocol and is transmitted to the communication line 1. The message frame includes the time information 145.

The communication circuit 11 watches the message frame which is transmitted through the communication line 1. When the message frame conforms with its own device address, the communication circuit 11 receives the message frame and send it to the comparison and determination processor 116. In the comparison and determination processor 116, the time information 145 included in the received message frame is compared with the time information memorized in the operation memory 17. When the time information 145 of the received message frame conforms with the memorized time information, the received message frame is determined not to be needed, since the wireless signal having the same time information 145 as that of the received message frame is already received via the wireless signal. The unnecessary received meassage frame is cancelled.

When the time information 145 of the message frame is different from the time information memorized in the operation memory 117, the message frame is determined that it is mecessary. Then the time information in the received message frame is applied to the operation memory 117, and the time information in the operation memory 117 is replaced with the time information in the received message frame. The command information in the received message frame is decoded by the communication signal decoder 15 and is applied to a device controller (TV controller 14.1, VCR controller 14.2 or CD controller 14.3). Thus, the AV apparatus is controlled by the device controller on the basis of the command information.

Figure 9:
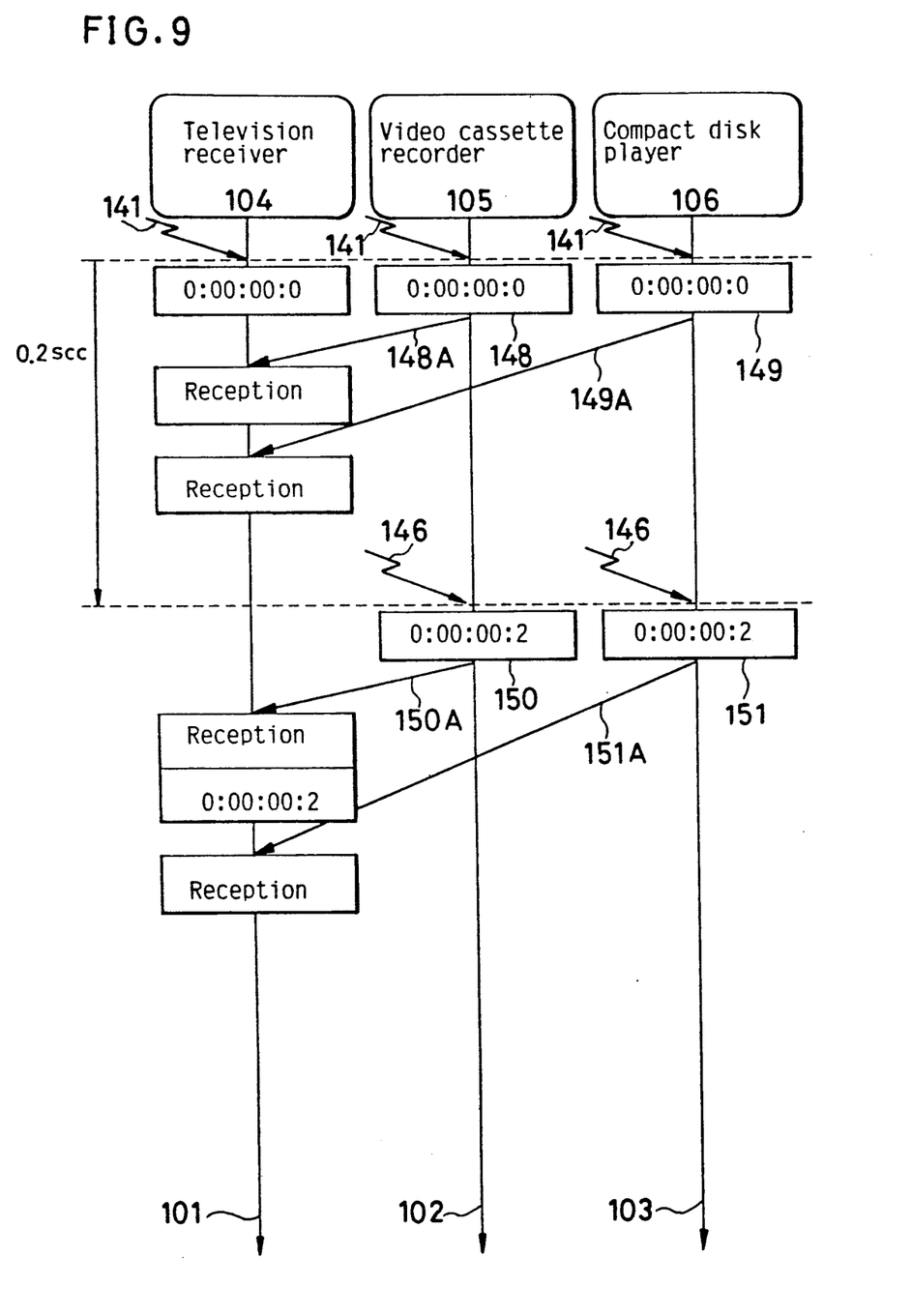
FIG. 9 is a timing chart of operation of the second embodiment.

FIG. 9 is a timing chart in operation of the second embodiment.

Referring to FIG. 9, vertical lines 101, 102 and 103 represent the elapsed time from the upper position toward the lower position in operation of the television receiver 104, video cassette recorder 105 and compact disc player 106, respectively. Zigzag arrows 141 and 146 represent wireless signals of the wireless signal transmitter 107 and arrows 148A, 149A, 150A and 151A represent transfer of message frames 148, 149, 150 and 151, respectively.

Referring to FIG. 3, FIG. 8 and FIG. 9, the wireless signal 141 having the device information 16 for designating the television receiver 104, a command information 17 and the time information 145 of 0 hour, 0 minute, 0.0 second (hereinafter is referred to as 0:00:00:0) is received by the television receiver 104, video cassette recorder 105 and compact disc player 106, for example. The wireless signal 141 is decoded in the wireless signal receiver 13 of the television receiver 104. Since the television receiver 104 is designated by the device information, the command information 17 of the wireless signal is applied the TV controller 14.1 of the television receiver 104, and the time information "0:00:00:0" in the wireless signal is memorized in the operation memory 117. The television receiver 104 is controlled by the AV controller 14.1 on the basis of the command information in the wireless signal.

On the other hand, the decoded information of the wireless signal which is received by the wireless signal receiver 13 of the video cassette recorder 105 is sent to the communication signal encoder 12 because the received wireless signal has no device information of the video cassette recorder 105. The decoded information is made to a message frame 148 having the device information 16, command information 17 and time information 145. The message frame 148 is transmitted to the television receiver 104 through the communication line 1 as shown by arrow 148A.

In a similar manner, the wireless signal which is received by the wireless signal receiver 13 of the compact disc player 106 is decoded and is sent to the communication signal encoder 12 since the wireless signal has no device information of the compact disc player 106. The decoded signal is made to a message frame 149 having the device information 16, command information 17 and time information 145. The message frame 149 is transmitted to the television receiver 104 through the communication line 1 as shown by arrow 149A.

The message frame 148 is received by the communication circuit 11 of the television receiver 104. The time information "0:00:000:0" of the received message frame is compared with the time information memorized in the operation memory 117. When the time information of the received message frame is identical with the time information memorized in the operation memory 117, the message frame is determined as that it is not needed and is cancelled.

In a similar manner, the message frame 149 including the time information "0:00:00:0" of the compact disc player 106 is also received by the television receiver 104. However, the time information of the message frame 149 is also identical with the time information memorized in the operation memory 117. Thus the message frame is determined as that it is not needed and is cancelled.

The subsequent wireless signal 146 is transmitted after at least 0.2 sec from transmission of the wireless signal 141. The wireless signal 146 includes the device information for designating the television receiver 104, a command information and the time information "0:00:00:2" (0 hour, 0 minute, 0.2 second). The time period 0.2 sec is the minimum transmission interval T of the wireless signal transmitter 107. It is assumed that the wireless signal 146 is received by the video cassette recorder 105 and the compact disc player 106, and is not received by the television receiver 104 as shown in FIG. 9. The operation memory 117 of the television receiver 104 maintains the time information "0:00:00:0". The message frame 150 including the time information "0:00:00:2" of the video cassette recorder 105 is transmitted to the television receiver 104. In the television receiver 104, the time information "0:00:00:2" of the message frame 150 is compared with the time information "0:00:00:0". Consequently, since the time information of the message frame 150 is different from the time information memorized in the operation memory 117, the command information of the message frame 150 is sent to the TV controller 14.1 through the communication signal decoder 15. Moreover, the time information "0:00:00:2" is applied to the operation memory 117, and the time information "0:00:00:0" is replaced with the time information "0:00:00:2". After then, the message frame 151 of the compact disc player 106 is received by the television receiver 104 since the time information of the message frame 151 is identical with the time information memorized in the operation memory 117, and the message frame 151 is determined as that it is not needed and is cancelled.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A remote control system comprising:
   at least a first and a second electronic apparatus system;
   means for transmitting a wireless signal, said signal including device information for designating one of said first and said second electronic apparatus systems, command information for controlling one of said first and said second electronic apparatus systems, and operation information for distinguishing said signal transmitted during each operation of said wireless signal transmitter;
   said first electronic apparatus system comprising:
      first means for receiving said wireless signal, said first electronic apparatus system determining, in accordance with said device information included in said wireless signal received by said first electronic apparatus system, whether said first electronic apparatus system is to be controlled by said command information;
      first means for controlling said first electronic apparatus system in accordance with said command information included in said wireless signal received by said first electronic apparatus system when said device information indicates that said first electronic apparatus system is to be controlled;
      first operation memory means for storing said operation information included in said wireless signal received by said first electronic apparatus system when said device information indicates that said first electronic apparatus system is to be controlled;
      first communication signal encoder means for forming a first message frame indicative of said wireless signal received by said first electronic apparatus system when said device information included in said wireless signal received by said first electronic apparatus system indicates that said first electronic apparatus system is not to be controlled;
      first interface means for outputting said first message frame and for receiving a second message frame, said second message frame being provided by said second electronic apparatus system;
      first means for comparing operation information included in said second message frame with said operation information stored in said first operation memory means and for calculating a first minimum reception time in accordance with said operation information stored in said first operation memory means and said operation information included in said second message frame, said first comparing means comparing said first minimum reception time to a first elapsed time, said first elapsed time being an amount of time measured from when said operation information included in said wireless signal received by said first electronic apparatus system is stored in said first operation memory means to when said second message frame is received through said first interface means, said first electronic apparatus system being controlled in accordance with command information included in said second message frame when said first elapsed time is larger than said first minimum reception time, said first comparing means replacing said operation information stored in said operation memory means with said operation information included in said second message frame when said first elapsed time is larger than said first minimum reception time; and first means for decoding said second message frame when said first elapsed time is larger than said first minimum reception time, said first decoding means supplying said command information included in said decoded second message frame to said first controlling means when said first elapsed time is larger than said first minimum reception time; and said second electronic apparatus system comprising:

second means for receiving said wireless signal, said second electronic apparatus system determining, in accordance with said device information included in said wireless signal received by said second electronic apparatus system, whether said second electronic apparatus system is to be controlled by said command information;

second means for controlling said second electronic apparatus system in accordance with said command information included in said wireless signal received by said second electronic apparatus system when said device information indicates that said second electronic apparatus system is to be controlled;

second operation memory means for storing said operation information included in said wireless signal received by said second electronic apparatus system when said device information indicates that said second electronic apparatus system is to be controlled;

second communication signal encoder means for forming said second message frame indicative of said wireless signal received by said second electronic apparatus system when said device information included in said wireless signal received by said second electronic apparatus system indicates that said second electronic apparatus system is not to be controlled;

second interface means for outputting said second message frame and for receiving said first message frame, said first message frame being provided by said first electronic apparatus system;

second means for comparing said operation information included in said first message frame with said operation information stored in said second operation memory means and for calculating a second minimum reception time in accordance with said operation information stored in said second operation memory means and said operation information included in said first message frame, said second comparing means comparing said second minimum reception time to a second elapsed time, said second elapsed time being an amount of time measured from when said operation information included in said wireless signal received by said second electronic apparatus system is stored in said second operation memory means to when said first message frame is received through said second interface means, said second electronic apparatus system being controlled in accordance with said command information included in said first message frame when said second elapsed time is larger than said second minimum reception time, said second comparing means replacing said operation information stored in said second operation memory means with said operation information included in said first message frame when said second elapsed time is larger than said second minimum reception time; and second means for decoding said first message frame when said second elapsed time is larger than said second minimum reception time, said second decoding means supplying said command information included in said decoded first message frame to said second controlling means when said second elapsed time is larger than said second minimum reception time; and means for providing communication between said first and said second electronic apparatus systems, said communication providing means being coupled to said first and said second interface means.

2. A remote control system as in claim 1, said operation information included in the wireless signal is one of a plurality of numerals of a predetermined progression.

3. A remote control system comprising:

means for transmitting a wireless signal, said signal including device information, command information and operation information for distinguishing said signal transmitted during each operation of said wireless signal transmitter, said operation information including information indicative of a time at which said wireless signal transmitter is operated;

at least a first and a second electronic apparatus system to be controlled by said command information included in said wireless signal, said first electronic apparatus system comprising:

first means for receiving said wireless signal and determining, in accordance with said device information included in said wireless signal received by said first electronic apparatus system, whether said first electronic apparatus system is to be controlled;

first means for controlling said first electronic apparatus system in accordance with said command information included in said wireless signal received by said first electronic apparatus system when said device information indicates that said first electronic apparatus system is to be controlled;

first operation memory means for storing said operation information included in said wireless signal received by said first electronic apparatus system when said device information indicates that said first electronic apparatus system is to be controlled;

first communication signal encoder means for forming a first message frame indicative of said wireless signal received by said first electronic apparatus system when said device information included in said wireless signal received by said first electronic apparatus system indicates that said first electronic apparatus system is not to be controlled;

first interface means for outputting said first message frame and for receiving a second message frame, said second message frame being provided by said second electronic apparatus system;

first means for comparing operation information included in said second message frame with said operation information stored in said first operation memory means, said first electronic apparatus system to be controlled in accordance with command information included in said second
message frame when said operation information
included in said second message frame differs
from said operation information stored in said
first operation memory means, said first comparing means replacing said operation information
stored in said first operation memory means with
said operation information included in said second message frame when said operation information included in said second message frame differs from said operation information stored in
said first operation memory means; and first means for decoding said second message frame
when said operation information included in said
second message frame differs from said operation
information stored in said first operation memory means, said first decoding means supplying
said command information included in said decoded second message frame to said first controlling means when said operation information included in said second message frame differs from
said operation information stored in said first
operation memory means; and said second electronic apparatus system comprising:
second means for receiving said wireless signal and
determining, in accordance with said device
information included in said wireless signal received by said second electronic apparatus system, whether said second electronic apparatus
system is to be controlled;

second means for controlling said second electronic apparatus system in accordance with said
command information included in said wireless
signal received by said second electronic apparatus system when said device information indicates that said second electronic apparatus system is to be controlled;

second operation memory means for storing said
operation information included in said wireless
signal received by said second electronic apparatus system when said device information indicates that said second electronic apparatus system is to be controlled;

second communication signal encoder means for
forming a second message frame indicative of
said wireless signal received by said second electronic apparatus system when said device information included in said wireless signal received
by said second electronic apparatus system indicates that said second electronic apparatus system is not to be controlled;

second interface means for outputting said second
message frame and for receiving said first message frame, said first message frame being provided by said first electronic apparatus system;

second means for comparing operation information
included in said first message frame with said
operation information stored in said second operation memory means, said second electronic
apparatus system to be controlled in accordance
with command information included in said first
message frame when said operation information
included in said first message frame differs from
said operation information stored in said second
operation memory means, said second comparing means replacing said operation information
stored in said second operation memory means
with said operation information included in said
first message frame when said operation information included in said first message frame differs
from said operation information stored in said
second operation memory means; and second means for decoding said first message frame
when said operation information included in said
first message frame differs from said operation
information stored in said second operation
memory means, said second decoding means
supplying said command information included in
said decoded first message frame to said second
controlling means when said operation information included in said first message frame differs
from said operation information stored in said
second operation memory means; and means for providing communication between said
first and said second electronic apparatus systems,
said communication providing means being coupled to said first and said second interface means.

* * * * *